United States Patent [19]
Hanson

[11] Patent Number: 5,276,558
[45] Date of Patent: Jan. 4, 1994

[54] ELECTRONIC INFORMATION TAG

[75] Inventor: Bruce R. Hanson, New Hope, Minn.

[73] Assignee: Rimage Corporation, Minneapolis, Minn.

[21] Appl. No.: 670,953

[22] Filed: Mar. 18, 1991

[51] Int. Cl.⁵ .............................................. G11B 5/86
[52] U.S. Cl. .................................. 360/15; 360/98.06; 360/99.09
[58] Field of Search ....................... 360/15, 16, 13, 27, 360/98.01, 98.05, 98.06, 99.09; 369/84, 83

[56] References Cited

U.S. PATENT DOCUMENTS

| | | | |
|---|---|---|---|
| 4,494,156 | 1/1985 | Kadison et al. | 360/15 |
| 4,707,750 | 11/1987 | Anderson et al. | 360/15 |
| 4,903,154 | 2/1990 | Costas et al. | 360/98.06 |

FOREIGN PATENT DOCUMENTS

| | | | |
|---|---|---|---|
| 63-211170 | 9/1988 | Japan | 369/84 |
| 2-149969 | 6/1990 | Japan | 369/84 |

Primary Examiner—Robert J. Pascal
Assistant Examiner—Tan Dinh
Attorney, Agent, or Firm—Palmatier, Sjoquist & Helget

[57] ABSTRACT

An apparatus and method for automatically self-configuring a disk drive to a disk duplicating machine and master image to be reproduced. A printed circuit board for the disk drive includes a non-volatile memory for storing information relating to the disk drive capabilities, and information relating to the manufacture of the disk drive, and information relating to the usage of the disk drive. The disk duplicating machine may access and modify information in the non-volatile memory.

11 Claims, 3 Drawing Sheets

ELECTRONIC INFORMATION TAG

BACKGROUND OF THE INVENTION

The present invention relates to an apparatus for electronically identifying a particular item of equipment, and for identifying critical parameters associated with the equipment, and for preserving a historical record of equipment use. In particular, the invention relates to electromechanical systems wherein equipment modules may be interchangeably used, to provide a convenient and portable record of such information which is always a part of the equipment module itself.

The invention finds particular utility in connection with diskette duplication systems, wherein various electromechanical modules are frequently interchangeably used within a disk duplicating system. In such system an electromechanical handler and loader mechanism is positioned adjacent a magnetic disk drive unit, and the handler is arranged to receive a stack of unrecorded diskettes, thereafter sequentially feeding the diskettes into the disk drive unit for recording and checking, and the recorded diskettes are ejected from the magnetic disk drive back into the handler mechanism, where they are moved along to a further handling location. The magnetic disk drive unit is typically a commercially available device, and the system is designed to accommodate drive units manufactured by any number of equipment manufacturers. Various different magnetic drive units are interchangeably connected into the system from time to time, depending upon the diskette recording jobs which are being handled by the system. Each of these magnetic drive units require periodic maintenance, and it is extremely difficult to keep an accurate and ongoing record of the usage of the magnetic drive units in the system because of the frequency of drive unit interchangeability. Further, each magnetic drive unit has a different set of electronic interface characteristics which must be accommodated to the system, and this interface compatibility must be incorporated into the system before each drive unit is operated.

In the prior art, the problem of interchanging magnetic drive units in the foregoing system was solved by requiring the operator to follow a rigorous start-up procedure, wherein the operator would utilize a keyboard or like device to input into the system the various operating parameters which were relevant to the magnetic drive unit connected into the system. Since the system incorporates a computer processor, the keyboard entries were recognizable by the processor, and were used by the processor to set up the desired communications formats for the system. An operator error in setting up these formats could result in a defective diskette recording operation, which could go undetected until such time as the prerecorded diskettes were actually used in another computer system. In some cases, operator errors result in equipment malfunctions, with the need to shut down the system while the equipment was serviced.

Disk duplication is a high-volume business. Thousands of disks may be copied daily by one disk duplicating machine for the copying process to be economically efficient. Accordingly, it is preferable that down time is minimized.

A complicating factor in the commercial disk duplicating business is the availability of a large number of diverse brands and models of disk drives. For example, there are a plurality of models designed for accommodating both 3-½ inch diskettes and 5-¼ inch diskettes, and within this plurality of brands and models there exists a further diversity of magnetic recording techniques and conventions. The task of disk duplication must frequently be accommodated to particular brands and/or models of disk drives, and therefore the disk duplicating machine must be designed so as to interchangeably accept the various disk drive brands and/or models. This problem is solved in industry by designing various mechanical adapters for mounting particular disk drives, which adapters are designed to uniformly position the disk drive access openings and lever actuators for engagement by the disk duplicating machine. Such adapters enable a "quick-change" of disk drives to accommodate disk duplicating jobs for the variety of such machines.

In the prior art, after the operator mounts the correct disk drive in the disk duplicator machine, the operator refers to a crib sheet to enter configuration information such as the bit window margin default value, the read threshold default value, the drive code of the disk drive, the drive operation of the disk drive, the drive table version code, a code indicating the source for obtaining recording density, the drive part number, the drive size, the tracks per inch, the drive media density, the drive mode, the low density media information, the high density media information, the drive align interval, and the drive clean interval. Of course, the entering of such data is prone to human error.

SUMMARY OF THE INVENTION

A principal object of the present invention is to provide an electronic apparatus which is physically made a part of a modular equipment item, to electroncally identify the module, certain module operating parameters, and to maintain a historical record of modular usage.

Another object of the present invention is to provide an electronic information tag for magnetic disk drive units which may be interchangeably connected into a disk duplicating machine.

A further object of the present invention is to provide for the automatic configuration of a disk drive to a disk duplicating machine and master image to be reproduced.

A feature of the present invention is the provision in a disk duplicating machine having a quick change disk drive, of the disk drive having a non-volatile memory for storing disk drive configuration information relating to certain capabilities of the disk drive for automatic configuration of the disk drive to the disk duplicating machine and master image to be copied.

Another feature is the provision in such a disk duplication machine, of a non-volatile memory for the disk drive, storing historical information on the usage of the disk drive.

Another feature is the provision in such a disk duplicating machine, of a non-volatile memory for the disk drive, storing manufacturing process information for product tracking purposes.

Another feature is the provision in such a disk duplicating machine, of the non-volatile memory comprising an electrically erasable programmable read-only memory.

An advantage of the present invention is that a quick-change disk drive may be configured more quickly to the disk duplicating machine.

Another advantage of the present invention is that a quick-change disk drive may be configured to the disk duplicating machine and master image with less chance for error.

Another advantage of the present invention is that a quick-change disk drive assembly may be serviced at intervals determined by usage of the disk drive.

A further advantage of the present invention is that it provides a product tracking record for maintenance and other purposes, which is physically made a part of the product itself.

DETAILED DESCRIPTION OF PREFERRED EMBODIMENT

Figure 1:
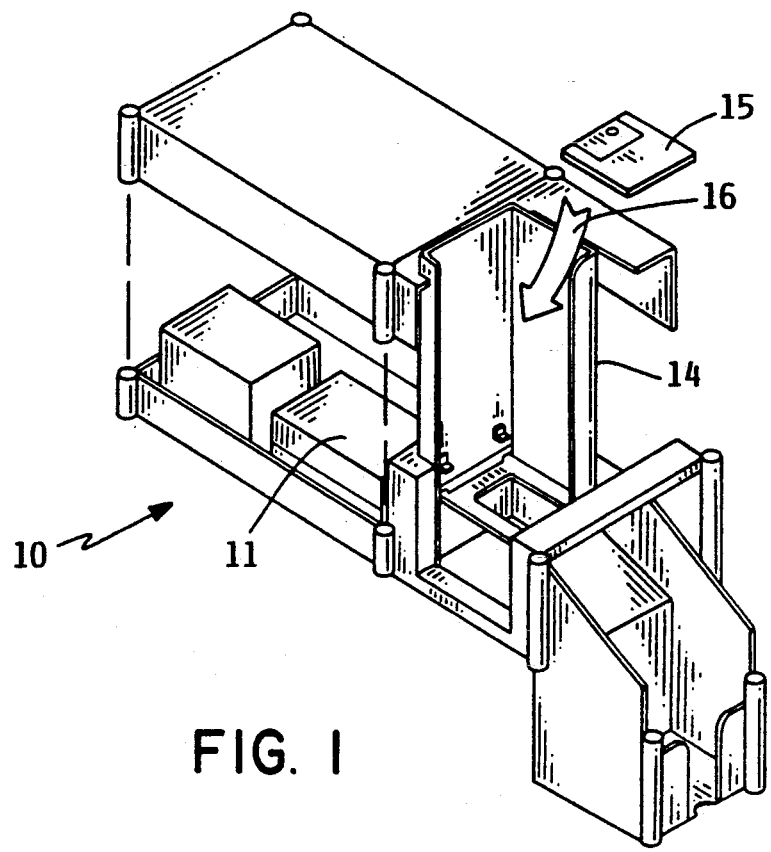
FIG. 1 is an isometric view of a representative system which utilizes the present invention.

As shown in FIG. 1, a disk duplicating apparatus is indicated in general by the reference numeral 10. It includes a quick-change disk drive 11, a disk loader control means with a hopper 14, a reject bin, an output bin, and a cover. A diskette 15 is shown in position for insertion into the input hopper 14, as indicated by the arrow 16.

The disk drive 11 is a quick-change drive. In other words, the disk drive 11 is a changeable assembly that is readily connectable to and removable from the disk duplicator 10 for replacing or being replaced by another disk drive, depending on the type of job to be performed.

Figure 2:
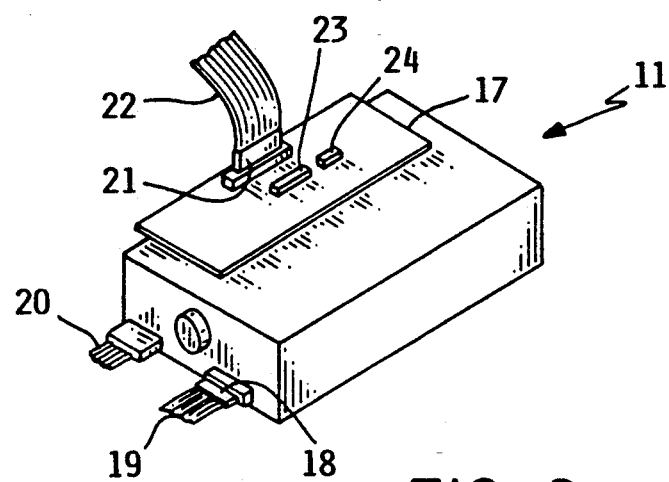
FIG. 2 is an isometric view of a disk drive unit showing the invention.

FIG. 2 shows an isometric view of a disk drive 11 with some of its associated circuitry and electrical connectors. Disk drive 11 has an associated electronic printed circuit board 17 which has mounted upon it a plurality of electronic components as necessary to control the operation of the disk drive. A cable connector 18 connects a cable 19 into the rear of disk drive 11, for carrying the electronic recording signals between disk drive 11 and a remotely located computer processor. A power cable 20 is also connected into the rear of disk drive 11. A connector 21 connects a cable 22 into the circuit board 17, cable 22 also being connected to a remotely located processor. Among the electronic components affixed to circuit board 17 are an input-output (I/0) buffer 23 and an electronically erasable programmable read-only memory (EEPROM) circuit 24. EEPROM circuit 24 retains the electronic information tag information associated with the present invention, and I/0 buffer 23 serves as an interface between EEPROM 24 and cable 22. EEPROM circuit 24 is one form of a non-volatile memory which is usable with the present invention, and other forms of non-volatile memory may equally well be used. In the preferred embodiment, EEPROM circuit 24 is an electrically erasable programmable read-only memory chip manufactured by National Semiconductor, under Type Designation 9346. I/0 buffer 23 is preferably a Type 74HC14 semiconductor chip, manufactured by a number of semiconductor manufacturers. Equivalent semiconductors are also available to perform the function of buffer 23. Circuit board 17, and its associated electronic components, are affixed to disk drive 11, and are therefore removably attachable to the system in association with disk drive 11.

In addition to the particular electronic circuits associated with the present invention, circuit board 17 may also have other electronic circuits associated with the control and recording operation within disk drive 11. For example, circuit board 17 may include analog circuits or circuits for simultaneously copying both sides of a diskette within disk drive 11.

The circuit board 17 utilizes EEPROM 24 for storing configuration information which identifies the capabilities of disk drive 11, which information is needed by the computer processor which controls the operation of disk duplicator apparatus 10. The configuration information stored in EEPROM 24 includes:

1. the bit window margin default value;
2. the read threshold default value;
3. the quick-change drive code;
4. the drive table version code;
5. a code indicating the source for obtaining recording density;
6. the drive part number;
7. the drive size
8. the number of tracks per inch;
9. the drive media density;
10. the drive mode;
11. low density media information:
12. high density media information;
13. space reserved for storage of further media;
14. the drive align interval; and
15. the drive clean interval.

EEPROM 24 is also receptive to storing historical information concerning the usage of the disk drive 11, for maintenance purposes. Such information is compiled as the disk drive is being used. At certain predetermined intervals, an operator may be reminded that maintenance is recommended. The quantification of the predetermined interval may itself be stored in EEPROM 24. The usage information may include user settable limits. As the printed circuit board 17 is permanently attached to the quick-change disk drive 11, this usage information is specific for its respective disk drive 11. This usage information includes:

1. the disk usage counter;
2. the drive align disk stamp;
3. the drive align interval;
4. the clean disk stamp; and
5. drive clean interval.

EEPROM 24 further may include manufacturing process information, for product tracking purposes. Such information to be stored includes:

1. the drive serial number;
2. the quality control inspection date; and
3. the quality control inspector number.

Figure 3:
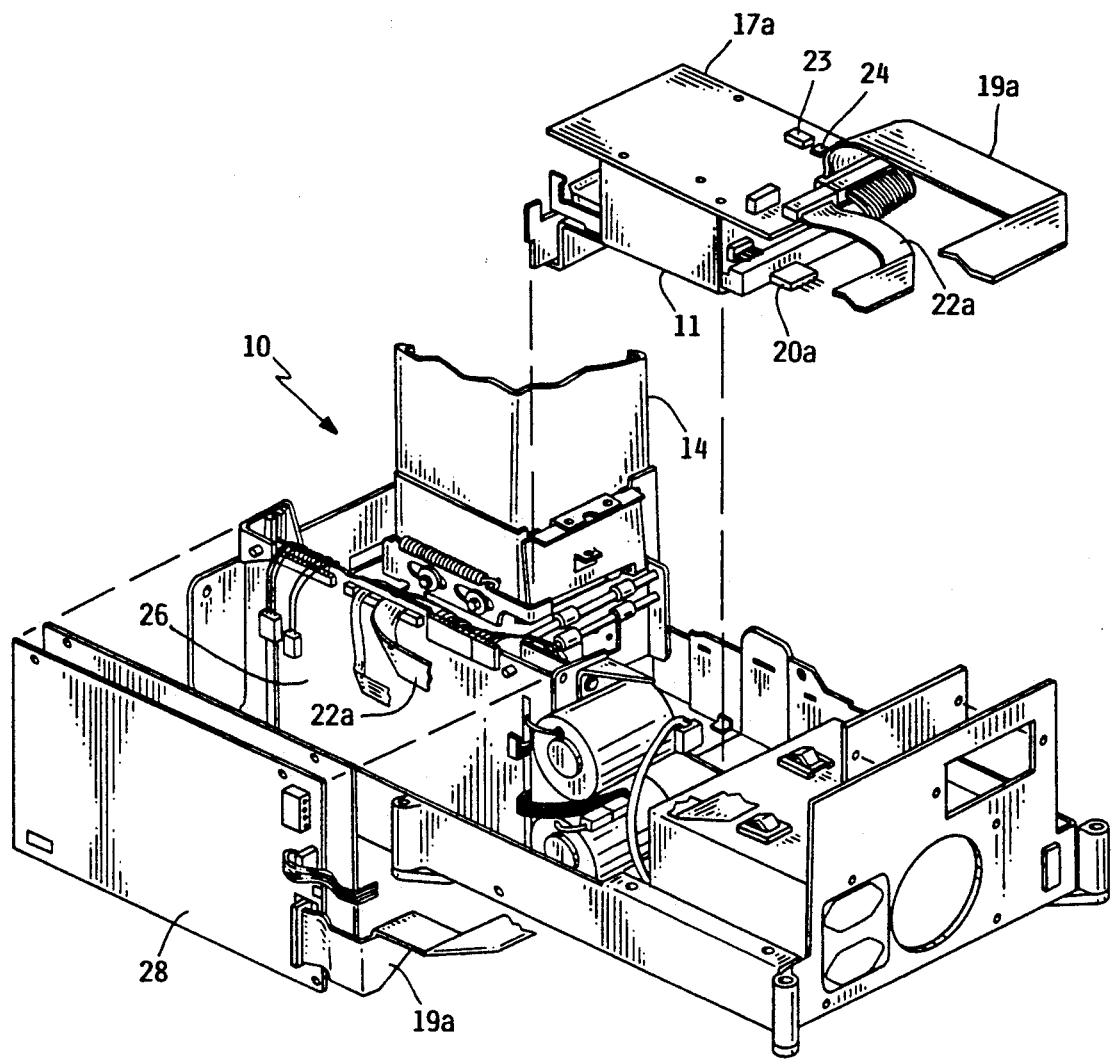
FIG. 3 is an isometric and partially exploded view of a system with the invention forming a part thereof.

FIG. 3 shows an isometric, and partially exploded, view of a system with the invention forming a part thereof. Disk drive 11 is illustrated in a position spaced away from disk duplicator 10, to illustrate the interchangeability of the disk drive in the disk duplicator 10. A number of cable connections may be made to circuit board 17a in order to connect the electronic circuit components associated with the disk drive to the appropriate computer processor and other control logic which may be found within this duplicator 10. For example, cable 20a may connect a power source into the disk drive 11, cable 19a may connect the magnetic recording and control signals between a computer processor and a disk drive 11, and cable 22a may connect the computer processor to the electronic circuit card of the present invention. An I/0 buffer 23 and an EEPROM circuit 24 are illustrated on the circuit card 17a, and it is to be understood that a plurality of other semiconductor circuits may also be attached to circuit card 17a.

Among the control circuits typically found within a disk duplicator 10 are a plurality of motor control circuits on circuit board 26, which may be positioned as shown. A plurality of disk drive interface circuits on circuit board 28 may similarly be positioned as shown, and both circuit boards may be attachable inside of disk duplicator 10. Computer processor semiconductors may also be located on the circuit boards. In the example of FIG. 3, the computer processor circuits may be interconnected with the I/0 buffer 23 and the EEPROM 24 on circuit board 17a via cable 22a which passes between the two circuit boards. I/0 buffer 23 enables the computer processor to read the memory cells within EEPROM 24, which have been prerecorded to store pertinent manufacturing and other information relating to the magnetic drive. Likewise, I/0 buffer 23 may be utilized to transmit signals from the computer processor to EEPROM 24, to provide an ongoing historical record for storage. This record may include such things as a count of the number of times the disk drive has been used, a preferred maintenance schedule, and other pertinent information.

Figure 4:
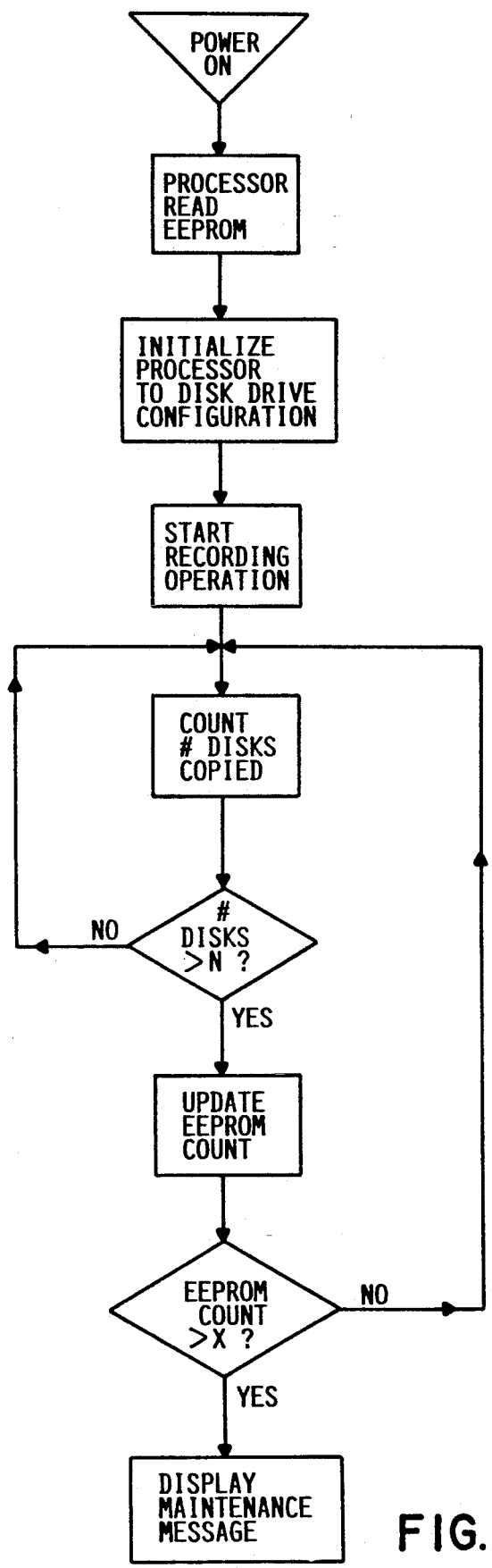
FIG. 4 is an operational flow chart showing the use of the invention.

FIG. 4 shows a generalized flow chart of the use of the invention in typical operation. When the power to the system is turned on, the computer processor reads the prestored configuration information from the EEPROM on the disk drive unit. This prestored information includes the serial number of the disk drive unit, the part number, and may include other pertinent manufacturing information such as the manufacturing date and/or batch. In some systems, the information read from the EEPROM may be displayed by the computer processor on a suitable operator display panel. The information read from the EEPROM enables the computer processor to set up the appropriate software and other control mechanisms to adapt the disk duplicator system to the particular disk drive unit which has been installed in the system. The computer processor then commands the system to begin its recording operation, and during the recording operation the processor maintains a count of the number of diskettes which have been recorded by the disk drive unit. When this accumulated count reaches a predetermined value N, the computer processor transmits the count value to the EEPROM to store an updated count value in the EEPROM. At such time as this updated count value equals or exceeds the recommended maintenance count X (which is another count value prestored in the EEPROM), the computer processor may prepare and transmit a maintenance display message to the operator display panel. This notifies the operator that preventive maintenance is called for, and the disk drive may be removed from the system to have the appropriate maintenance performed.

If the disk drive assembly is removed from the system and replaced by another disk drive assembly, all of the updated count values stored in each EEPROM are retained. At some later time, when the first disk drive assembly may be interchanged with another disk drive assembly and again used in the disk duplicator system, an up-to-date record remains in the EEPROM, for ready reference via the software described above. In this manner, the operator always has an accurate and up-to-date record of usage of the disk drive unit, regardless of the frequency of interchangeability which the disk drive undergoes in the system. Further, all of the configuration settings required for interacting with the disk drive unit are automatically carried along with the disk drive, and may be read by a computer processor at the time the disk drive is installed in the system, thereby eliminating any operator error which otherwise would result from erroneous entries. The present invention may also be used in conjunction with remote or network processors, wherein a remote processor may interrogate a local processor to obtain particular information concerning the disk drive being utilized by the local processor. In a networking situation it is therefore possible for maintenance and usage records to be continually updated regardless of the location of the disk duplicator systems.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A disk duplicating apparatus for copying a master image onto one or more of disks, comprising:
   a) a housing comprising hopper means for retaining the plurality of disks to be copied, and an outlet for discharging the disks,
   b) computer control means coupled to the housing for controlling the apparatus, the control means having display means for communication with an operator,
   c) copy control means in the housing for reading and holding the master image to be copied, for sending and receiving data from the computer, and sending the master image to a disk drive mechanism recording input,
   d) a disk drive mechanism having according input for copying the master image on the one or more disks and being removably mounted on the housing, the disk drive mechanism having a non-volatile memory having means for storing disk drive configuration information relating to certain capabilities of the disk drive mechanism, and means for connecting said non-volatile memory to said computer control means independently of said recording input, whereby the configuration information may be read by the computer control means to determine whether the capabilities of the disk drive mechanism and copy control means have been matched and whether copying should commence.

2. The apparatus of claim 1, wherein the non-volatile memory of the disk drive mechanism also includes means for storing historical information on usage of the disk drive mechanism for maintenance purposes.

3. The apparatus of claim 1, wherein the non-volatile memory of the disk drive mechanism also includes means for storing manufacturing process information for product tracking purposes.

4. The apparatus of claim 1, wherein the non-volatile memory of the disk drive mechanism further comprises an electrically erasable programmable read-only memory.

5. The apparatus of claim 4, wherein the disk drive mechanism further comprises a printed circuit board which includes said non-volatile memory.

6. A method for automatically configuring a removable disk drive to a disk duplicating apparatus for copying a master image onto one or more disks, comprising the steps of:
   a) storing disk drive configuration information in a non-volatile memory affixed tot he disk drive;
   b) inserting the disk drive into a disk duplicating apparatus;
   c) reading the stored configuration information into the disk duplicating apparatus; and
   d) electronically configuring the disk drive and disk duplicating apparatus to an operable match for reproducing the master image, based upon said configuration information.

7. A method for automatically configuring a changeable disk drive assembly to a disk duplicating apparatus for copying a master image onto one or more disks, comprising the steps of:
   a) storing configuration information describing the capabilities of the changeable assembly in a non-volatile memory affixed to the changeable assembly;
   b) reading the stored configuration information into the disk duplicating apparatus; and
   c) electronically adapting the disk duplicating apparatus and disk drive, in response to the configuration information, to form an operable match for reproducing said master image onto said one or more disks placed into said changeable assembly.

8. The method of claim 6, and further comprising the step of storing historical information on the usage of the disk drive in the non-volatile memory.

9. The method of claim 6, and further comprising the step of storing manufacturing process information in the non-volatile memory for product tracking purposes.

10. The method of claim 7, wherein the changeable assembly comprises a disk drive.

11. In a disk duplicating apparatus for copying a master image stored in a copy emory to a plurality of unrecorded disks, wherein the unrecorded disks are stacked in a hopper having a discharge outlet and the apparatus is controlled by a computer processor having display means for communicating with an operator, and a removable disk drive mechanism having means for receiving an unrecorded disk from the hopper discharge outlet and means for copying the master image thereon under control of the computer processor, the improvement in disk drive mechanism comprising a non-volatile memory circuit affixed to said disk drive mechanism, and means for electrically connecting said memory circuit to said computer processor separate from said means for copying the master image; said memory circuit including a stored database comprising data describing the electrical and mechanical construction, data describing the number of usage cycles, and data describing the unique identification of the disk drive mechanism.

* * * * *